June 16, 1925. 1,542,352

F. H. ANKENY

GRAPEFRUIT PREPARING DEVICE

Filed Nov. 28, 1924  2 Sheets-Sheet 1

Inventor:
Floyd H. Ankeny,

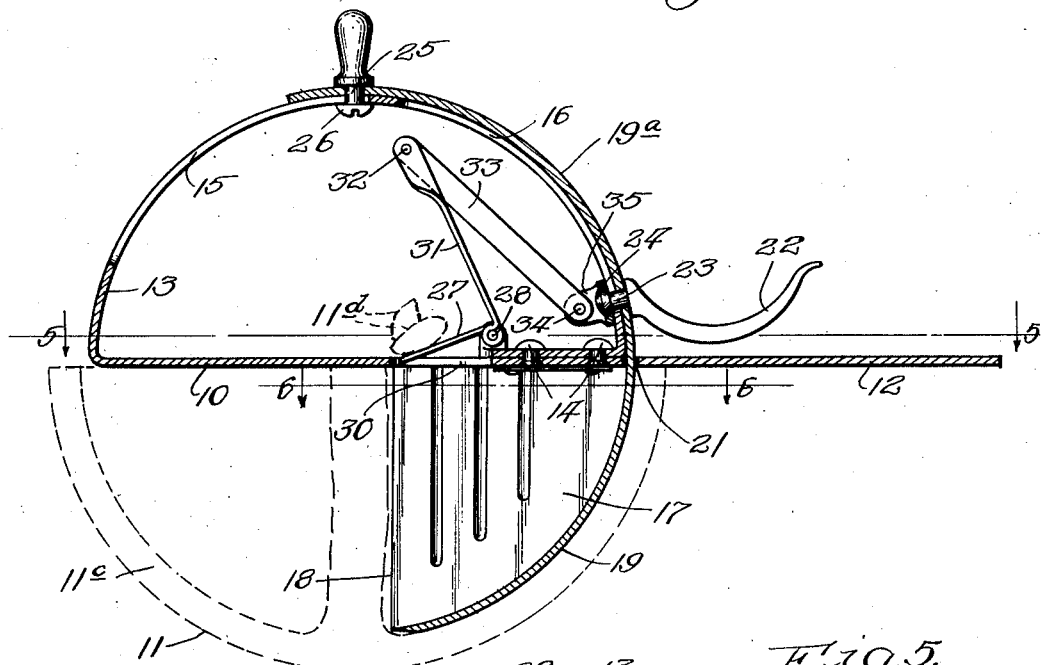

Patented June 16, 1925.

1,542,352

UNITED STATES PATENT OFFICE.

FLOYD H. ANKENY, OF CHICAGO, ILLINOIS.

GRAPEFRUIT-PREPARING DEVICE.

Application filed November 28, 1924. Serial No. 752,635.

*To all whom it may concern:*

Be it known that FLOYD H. ANKENY, a citizen of the United States, residing at Chicago, in the county of Cook and State of Illinois, has invented a new and useful Improvement in Grapefruit-Preparing Devices, of which the following is a specification.

My invention as to one aspect thereof relates to a device for severing the pulp-segments of grape fruit from the radiating cell-forming partitions and the rind between which the pulp-segments extend; and as to another aspect thereof to a device which operates on the pulp-segments as stated, and in addition removes the seeds from the pulp-segments.

Figure 1:
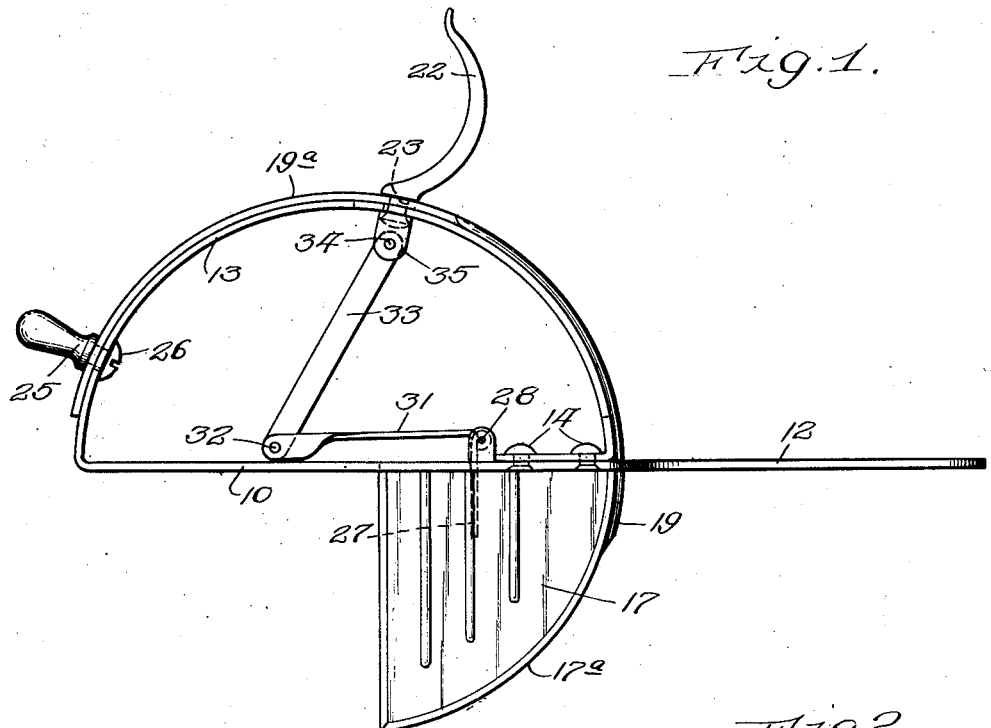
Figure 2:
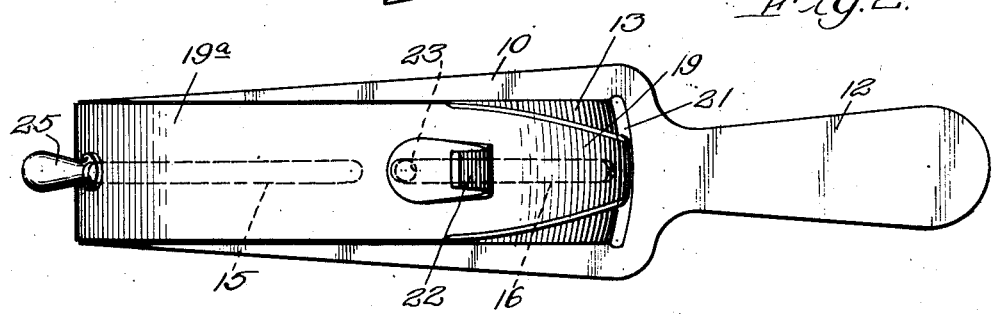
Figure 3:
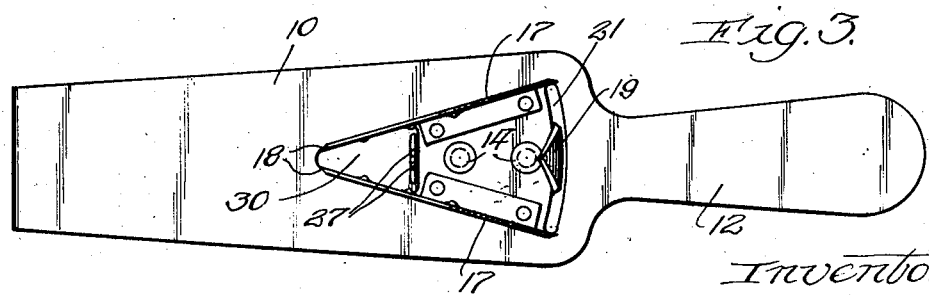

My primary objects are to provide a device whereby the pulp-segments may be readily and quickly severed from the partitions referred to and the rind, without cutting into or mashing the pulp-segments; to provide a simple and economical construction for effecting the above result; to provide for the ready removal of the seeds from the pulp-segments, and preferably in the operation of severing the pulp-segments from the partitions and rind, to provide a device for accomplishing the last-referred to purpose; and other objects as will be manifest from the following description:

Referring to the accompanying drawings:

Figure 1 is a view in side elevation of a device embodying my invention. Figure 2 is a plan view of the same. Figure 3 is a bottom plan view of the device, these views showing the device in normal position. Figure 4 is a view like Fig. 1 showing the device when operated to separate a pulp-segment from the cell formed by the partitions and rind and in which the pulp-segment is located and to remove the seeds from this segment. Figure 5 is a bottom plan view of the device in the condition shown in Fig. 4; and Figure 6, a section taken at the line 6—6 on Fig. 4 and viewed in the direction of the arrows, the device being shown in operative position on a half-section of grape-fruit which latter is shown by dotted lines.

The device shown comprises a body portion comprising a plate 10 adapted to be seated on the cut face of a half-section of grape-fruit represented at 11, and provided with a handle-extension 12 which extends beyond the fruit and by which the device is grasped by one hand of the operator. The body portion also comprises a semi-circular bow-portion 13 shown as formed integrally at one end with one end of the plate 10 and secured at its opposite end to the plate 10 between the ends of the latter as represented at 14, the bow-portion 13 forming a guide for operating parts hereinafter described and to this end containing alining slots 15 and 16.

The plate 10 is provided between its ends with depending cutters 17, rigidly connected therewith and converging away from the handle portion 12 as shown for severing the pulp-segments $11^a$ from the adjacent partitions $11^b$. The cutters 17 present at their converging portions the straight knife-like edges 18 which extend at substantially right angles to the plate 10 and closely adjacent each other, their lower edges which are of knife-like form curving outwardly and upwardly as shown at $17^a$ in Fig. 1, each of these cutters being of substantially the same shape and size as the cell-forming partitions $11^b$ and the angle at which they converge corresponding substantially with the angle at which adjacent ones of the said partitions converge.

The device also comprises a movable cutter element represented at 19 for severing the pulp-segments from the rind $11^c$, this cutter element being curved in the direction of its length as shown in Figs. 1 and 4 with its lower edge portions, which are knife-like and are represented at 20, converging downwardly as shown in Fig. 6. The cutter member 19 extends freely through an opening 21 in the plate 10 and its upper portion $19^a$ lies against the outer curved surface of the bow-portion 13 upon which it is slidable. The cutter member 19 is provided between its ends with a radiating projection 22 shown as curved and having a stud-portion 23 which projects through the guide slot 16 and extends at its inner, headed portion 24 at the inner, under, side of the bow member 13. The end of the member 19 opposite that equipped with the cutting edges 20 is provided with a stud 25 extending through the slot 15 and provided at its inner end with a head 26 overlapping the inner side of the bow 13.

It will be understood from the foregoing that the cutter member 19 is held on the bow member 13 to travel in a curved path corresponding substantially to the curvature of the member 19 and that this path is practically co-incident with the curved cutting edges 17ª, and that the angle presented between the cutting edge portions of the member 19 is such that when the member 19 is moved to the position shown in Fig. 4 it will substantially fill the space between the cutters 17 at their cutting edges 17ª.

The mechanism described is provided for severing the pulp-segments 11ª from the partitions 11ᵇ and rind 11ᶜ of the fruit the device, in use, being applied to the cut face of the fruit, as shown in Fig. 1 to such position that the cutters 17 will cut downwardly along the inner surfaces of adjacent partitions 11ᵇ and sever therefrom the pulp segment located between them. The cutter member 19 is then forced downwardly from the position shown in Fig. 1 to the position shown in Fig. 4, by pressing down on the stud 22 to sever the pulp segment from the rind, these conjoined operations freeing the pulp-segment for ready removal.

Provision is also made in the device shown for removing the seeds from the pulp-segment, the means provided for this purpose comprising a pair of converging fingers 27 which are mounted on a rock pin 28 supported by ears 29 extending upwardly from the plate 10, these fingers which operate through an opening 30 in the plate 10 being so proportioned and arranged, as shown, that in the position shown in Fig. 1 (the position occupied by them in the application of the device to the section of the fruit as above stated) they will extend downwardly below the plate 10 and into the pulp-segment a considerable distance from the apex of the segment and when rocked to the position shown in Fig. 4 will extend very close to said apex and thus operate to upwardly dislodge the seeds from the pulp-segment as shown in Fig. 4, in which figure the dislodged seeds are represented at 11ᵈ.

The fingers 27 are shown as connected with an operating arm 31 which extends at an angle to the fingers, these fingers and arm being preferably formed from a single strip of metal. The outer end of the arm 31 is pivoted at 32 to one end of a link 33 the outer end of which is pivoted, as represented at 34, to a plate 35 connected with the stud 22, the arrangement of the parts just described being such that the fingers 27 are rocked from the position shown in Fig. 1 to the position shown in Fig. 4 by the movement of the cutting member 19, as hereinbefore described, whereby the seeds 11ᵈ are removed from the pulp-segment and the pulp-segment severed from the partitions and rind by a single act of the operator in pushing down on the projection 22.

In accordance with the preferred manner of operating the device the operator, after positioning the device on the section of fruit to be operated on, as hereinbefore described, and while holding the device in place by grasping the handle 12 with his right hand, applies his left hand to the recessed portion of the part 22 and pushes down on the latter to move the parts to the position shown in Fig. 4. To return the parts to the position shown in Fig. 1 he merely reverses the movement of his hand, pushing upwardly on the stud 25.

While I have illustrated and described a particular construction embodying my invention, I do not wish to be understood as intending to limit it thereto, as the same may be variously modified and altered without departing from the spirit of my invention.

What I claim as new, and desire to secure by Letters Patent, is:

1. A device of the character set forth, comprising a pair of converging blades with their outer edges curved for severing a pulp segment from adjacent partitions of the fruit, and a blade for severing the pulp segment at the rind curved to generally conform to the curvature of the outer edges of said converging blades, with its side edges converging in general conformance to the convergence of the outer edges of said converging blades, said converging blades and said second-named blade being relatively movable.

2. A device of the character set forth, comprising a pair of converging blades with their outer edges curved for severing a pulp segment from adjacent partitions of the fruit, and a blade for severing the pulp segment at the rind curved to generally conform to the curvature of the outer edges of said converging blades, with its side edges converging in general conformance to the convergence of the outer edges of said converging blades, and said second-named blade being movable relative to said converging blades in a curved path adjacent the outer edges of said converging blades and generally in the direction of the length of said last-referred-to edges.

3. A device of the character set forth, comprising a support, a pair of converging blades fixed on said support with their outer edges curved for severing a plup segment from adjacent partitions of the fruit, and a blade for severing the pulp segment at the rind curved to generally conform to the curvature of the outer edges of said converging blades, with its side edges converging in general conformance to the convergence of the outer edges of said converging blades, said second-named blade guidingly engaging said support for movement, relative to said converging blades in a curved path adjacent the outer edges of said converging blades and generally in the direction of the length of said last-referred-to edges.

4. A device of the character set forth comprising in combination a support having a curved guiding surface, a pair of converging blades fixed on said support with their outer edges curved for severing a pulp segment from adjacent partitions of the fruit and a blade for severing the pulp segment at the rind curved to generally conform to the curvature of the outer edges of said converging blades, with its side edges converging in general conformance to the convergence of the outer edges of said converging blades, said second-named blade having a portion concentric with, and slidingly engaging, said curved guiding surface on said support, for the purpose set forth.

5. A device of the character set forth, comprising a support, and a member movable on said support and operating, when actuated, to engage the seeds in a pulp-segment and move them to the upper portion of the segment.

6. A device of the character set forth, comprising a support, and a member pivoted on said support and operating, when actuated, to engage the seeds in a pulp-segment and move them to the upper portion of the segment.

7. A device of the character set forth, comprising a support, and fingers spaced apart and pivoted on said support and operating, when actuated, to engage the seeds in a pulp-segment and move them into the upper portion of the segment.

8. A device of the character set forth, comprising a support, a pair of converging blades on said support with their lower edges curved for severing a pulp-segment from adjacent partitions of the fruit, a curved blade on said support for severing the pulp-segment from the rind, said first and second referred to blades being relatively movable, and a member movable on said support and operating, when actuated, to engage the seeds in the pulp-segment and move them into the upper portion of the segment.

9. A device of the character set forth, comprising a support, a pair of converging blades on said support with their lower edges curved for severing a pulp-segment from adjacent partitions of the fruit, a curved blade on said support for severing the pulp-segment from the rind, said first and second referred to blades being relatively movable, a member movable on said support and operating, when actuated, to engage the seeds in the pulp-segment and move them into the upper portion of the segment, and means operatively connecting together for simultaneous movement said member and those of said blades which are movable.

10. A device of the character set forth, comprising a support, a pair of converging blades fixed on said support with their lower edges curved for severing a pulp-segment from adjacent partitions of the fruit, a curved blade for severing the pulp-segment from the rind guidingly engaging the said support for movement in a curved path, a member movable on said support and operating, when actuated, to engage the seeds in the pulp-segment and move them into the upper portion of the segment, and means operatively connecting together for simultaneous movement said member and said curved blade.

FLOYD H. ANKENY.